United States Patent [19]

McMahon

[11] 4,293,188

[45] Oct. 6, 1981

[54] FIBER OPTIC SMALL DISPLACEMENT SENSOR

[75] Inventor: Donald H. McMahon, Carlisle, Mass.

[73] Assignee: Sperry Corporation, New York, N.Y.

[21] Appl. No.: 133,171

[22] Filed: Mar. 24, 1980

[51] Int. Cl.³ .......................... G02B 5/172; G02B 5/18
[52] U.S. Cl. ............................ 350/96.29; 250/237 G; 350/96.19; 356/395
[58] Field of Search ............... 350/96.15, 96.19, 96.29, 350/162 R, 272; 356/395, 396, 397; 250/237 G

[56] References Cited

U.S. PATENT DOCUMENTS

| | | | |
|---|---|---|---|
| 3,344,700 | 10/1967 | Brake | 356/395 X |
| 3,768,911 | 10/1973 | Erickson | 356/395 X |
| 4,049,965 | 9/1977 | Pettigrew | 250/237 G |
| 4,071,753 | 1/1978 | Fulenwider et al. | 350/96.29 X |

OTHER PUBLICATIONS de Lang et al., "Accurate Digital Measurement of Displacements . . . ", *Philips Tech. Rev.*, vol. 30, No. 6/7, 1969, pp. 149–160.
Harrison, "Digital Angular Displacement Measurement", *IBM Tech. Discl. Bulletin*, vol. 12, No. 7, Dec. 1969, p. 1045.

*Primary Examiner*—John D. Lee
*Attorney, Agent, or Firm*—Howard P. Terry

[57] ABSTRACT

An opto-electronic transducer is provided for converting small displacements into optical intensity or phase variations which may then be converted into varying electric currents. A first optical fiber guide is disposed with its end face stationary, for example, while a second optical fiber guide is disposed so that its free end may be laterally displaced from the axis of the first guide in proportion to the parameter to be measured. The sensitivity of the transducer is enhanced through the use of large core, large numerical aperture, multimode optical fibers. The opposed faces of the cooperating fibers are equipped with or are used to illuminate regular arrays of equally spaced opaque, absorptive, or reflective grating systems providing intensity or phase modulation of the propagating light energy in proportion to wave guide deflection.

37 Claims, 19 Drawing Figures

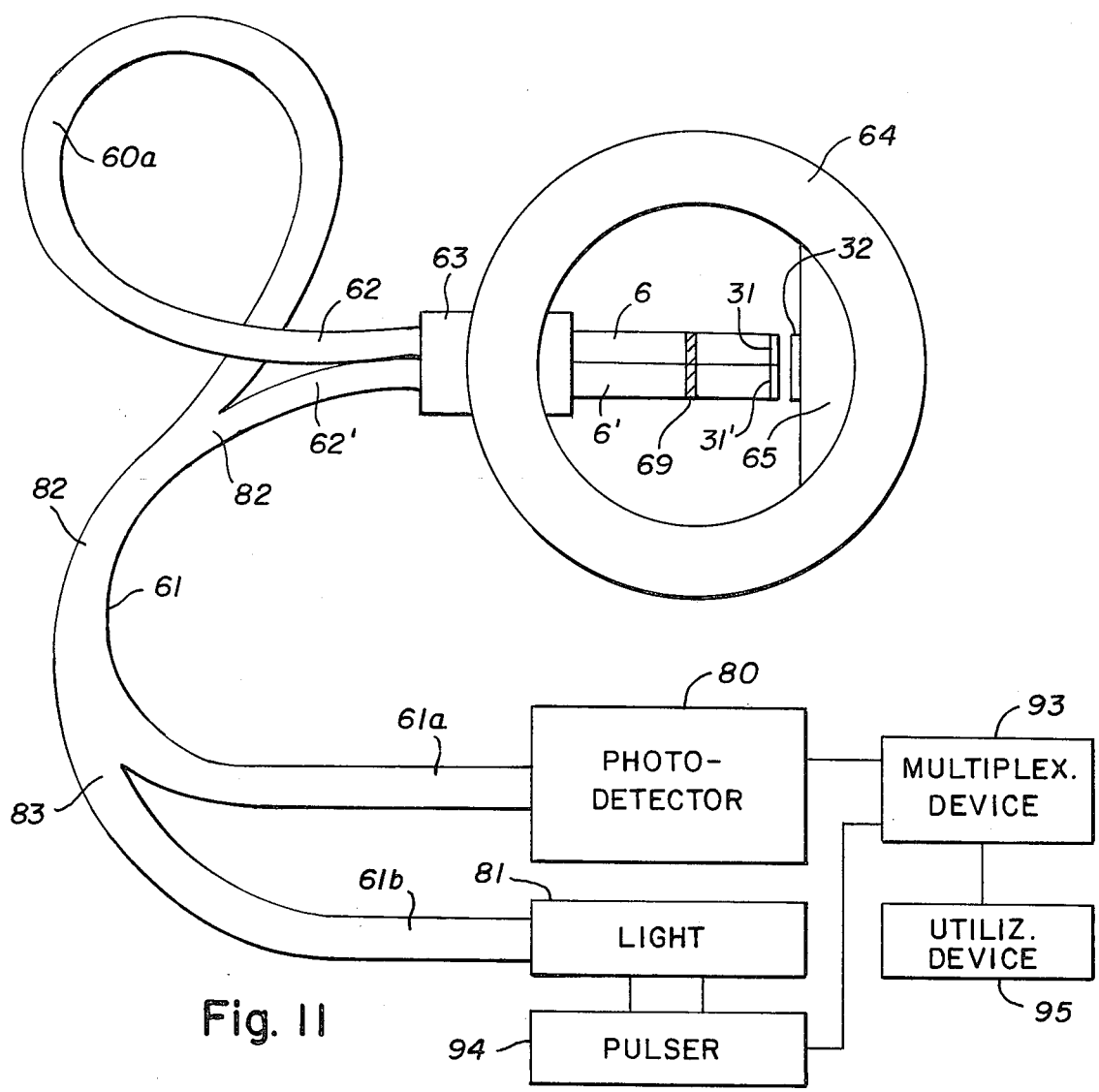
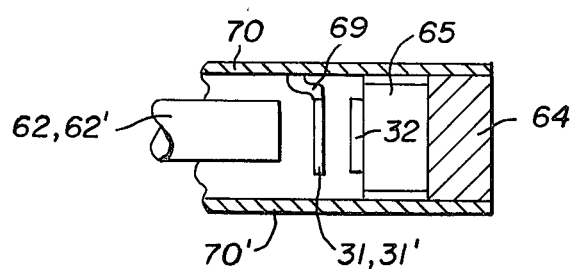
Fig. 11
Fig. 12
Fig. 12A

FIBER OPTIC SMALL DISPLACEMENT SENSOR

BACKGROUND OF THE INVENTION

1. Field of the Invention

The present invention relates to optical transducers and, more particularly, to transducers adapted to convert small displacements into variations of light intensity and thence into corresponding electrical current variations.

2. Description of the Prior Art

Prior art optical transducers, especially of the kind found useful in the past for converting the small deflections associated with sound signals present in a liquid medium into electrical signals, are generally discussed in the R. L. Gravel U.S. patent application Ser. No. 71,893, filed Sept. 4, 1979 for a "Fiber Optic Transducer and Method of Manufacture Therefor", and assigned to Sperry Corporation.

The Gravel fiber optic transducer includes two optical fibers each cut to have end faces substantially perpendicular to an axis and positioned with a small gap between the end faces of the fibers. One fiber is mounted to maintain its end face stationary, for example, while the other is cantilevered to permit displacement of its end face. When the fiber axes lie on a common straight line, light propagating in one fiber will couple with maximum intensity into the other fiber.

An acousto-optic transducer may be constructed in accordance with the Gravel invention by extending an optical fiber between two mounting structures disposed upon a base plate, mounting the fiber under tension to orient the axis along a straight line, bonding the fiber to both mounting structures to maintain the axis orientation thereafter, and cutting the fiber near the end of one mounting structure to obtain two fibers, one mounted to maintain its end face stationary and the other cantilevered to permit transverse displacement of its end face.

It will be clear to those skilled in the art that the displacement sensitivity of the Gravel transducer is governed by the diameter of the core of the optical wave guide. For example, if the free end of the long fiber is caused to vibrate, the light transmitted into and through the associated fixed short fiber varies from one hundred percent when the fiber axes are accurately aligned to zero when one fiber guide is displaced transversely by a distance equal to the core diameter. To obtain maximum pressure sensitivity, the axes of the cooperating fibers may be offset to approximately the fifty percent transmission condition at the prevailing static pressure value.

The Gravel device, when used with a conventional photo-detector-amplifier circuit in a sonar detector, desirably has a sensitivity at least equal to the sea noise ambient and insensitivity to pressure head variation. That is, the Gravel technique is not limited in sensitivity by the phase noise problem that conventionally plagues the interferometric single-mode sensing technique, but is limited only by the fundamentally irreducible electron shot noise characteristics of the photo-detector. Many other optical intensity modulation schemes are undesirably sensitive to pressure head changes.

While the prior art fiber optic approach is preferably selected in certain applications wherein displacement transducers are required, single mode fiber guides are necessary to achieve reasonable sensitivity. Also, the adjustment of the positions of the cooperating fiber ends is relatively critical in three dimensions. Means must be provided for making these adjustments, each of which calls for a tolerance of about one micron; while they may be relatively simple mechanically, there must be precise adjustments in three dimensions for each fiber, invariably adding to the cost of the transducer.

SUMMARY OF THE INVENTION

The present invention provides an improved fiber optical wave guide transducer for measuring small pressure changes or displacements, as in hydrophone devices and the like, and for converting them into optical, then into electrical signals. A first optical fiber guide is disposed with its end face stationary, for example, while a second optical fiber guide is disposed so that its free end may be laterally displaced from the axis of the first guide in proportion to variations in pressure or forces applied to the free end of the second guide. Under the influence of continuous pressure variations present within an acoustic medium in which the hydrophone is submerged, for example, the optical energy passing through the fiber wave guides is amplitude or phase modulated in a manner representative of the amplitude of the imposed pressure variations.

The operating sensitivity and other characteristics of the invention are improved, according to one feature of the invention, through the use of large core, large numerical aperture, multimode optical fibers. According to a second feature of the invention, the opposed faces of cooperating fibers cooperate with regular arrays of equally spaced opaque, absorptive, or reflective grating lines. The gratings may cause intensity or phase modulation of the propagating light energy in proportion to the wave guide deflection and may consist of stripes or arrays or of other regular patterns having spacings substantially smaller than the diameters of the optical fibers. In some of the embodiments moderately critical location tolerance must now be met in only one dimension. Matrices of grating lines may be placed on relatively large, relatively movable plates, while the fiber wave guides include collimating lenses and remain stationary. Hybrid structures may be realized.

BRIEF DESCRIPTION OF THE DRAWINGS

FIG. 11 represents a plan view of a reflection variant of the structure of FIGS. 1 and 9.

FIG. 12 is an elevation view in partial cross section of the embodiment of FIG. 11.

FIG. 12A is an elevation view of the end section of FIG. 12 illustrating an alternative embodiment wherein

DESCRIPTION OF THE PREFERRED EMBODIMENTS

Figure 1:
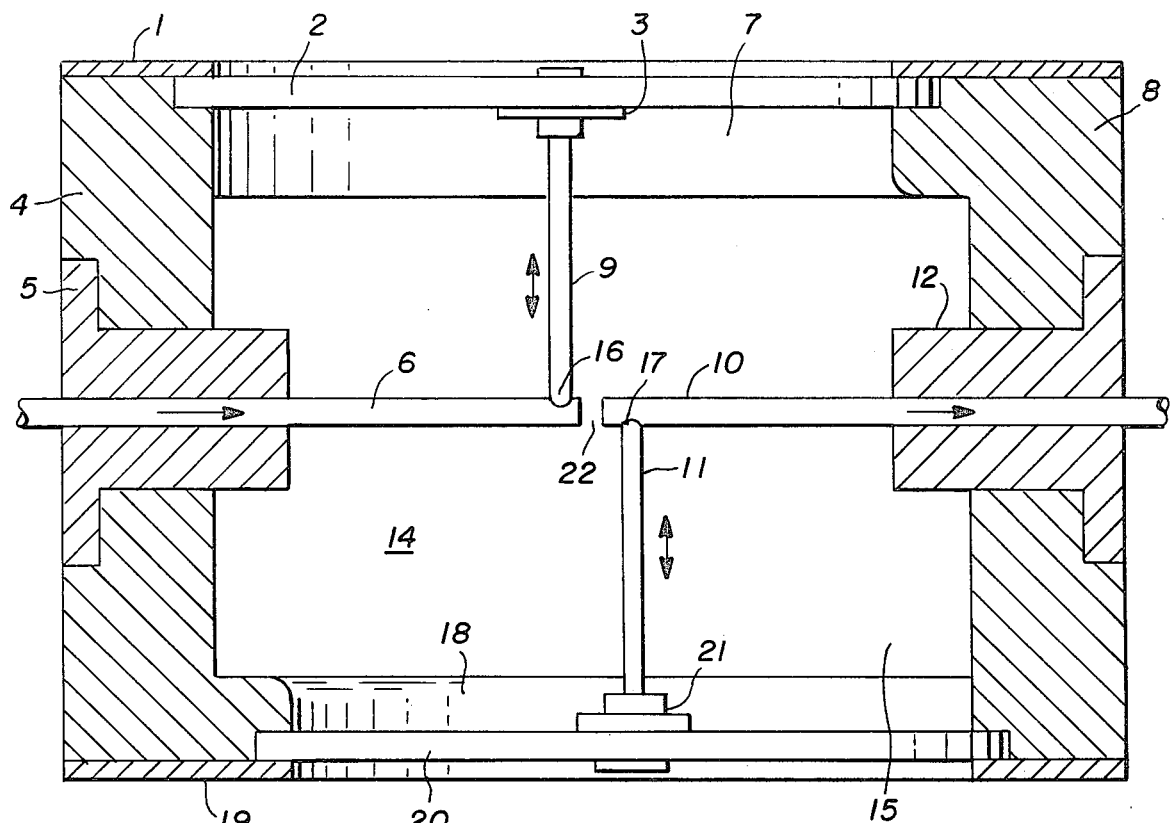
FIG. 1 is an elevation view in partial cross section of one embodiment of the invention.

A first embodiment of the invention will be discussed with respect to FIGS. 1, 2, and 3 where it is seen to reside within mounting means which may take the form of a closed casing including flat opposed end walls 4 and 8 and a pair of similar flat opposed side walls of which only wall 15 is seen in FIG. 1. Closure of the internal cavity 14 is completed by opposed parallel flexible circular pressure-responsive diaphragms 2 and 20 disposed in respective extensions 7 and 18 of end walls 4, 8 and affixed therein by the respective generally ring-shaped clamps 1 and 19. Clamps 1, 19 may be bonded to extensions 7, 18 by a suitable adhesive material or by conventional threaded fasteners (not shown) for holding the peripheries of diaphragms 2, 20.

Centrally in end wall 4 is disposed a metal ferrule 5 and an optical fiber guide 6 extending therethrough and normally ending near the center of cavity 14, which cavity may contain a conventional damping fluid. The center of diaphragm 2 is attached by fastener 3 to a stiff translatable rod 9 fastened at juncture 16 by a suitable adhesive adjacent the inner end of optical fiber guide 6. Fiber guide 6 may have a round cross section or, since it is normally intended to move radially in the plane of FIG. 1, may be square or rectangular in cross section. Guide 6 normally operates as the optical fiber light input to the apparatus.

In a similar manner, a fiber guide 10 serving as light output is mounted within a ferrule 12 opposite ferrule 5, the guide 10 extending inward of cavity 14 and normally ending near the middle of that cavity. In their quiescent state, optical fiber guides 6, 10 are disposed along a common axis with a short gap 22 formed between their inner ends. The center of diaphragm 20 is attached by a fastener 21 to a stiff translatable rod 11 fastened at juncture 17 by adhesive to a point adjacent the inner end of optical fiber 10. The relative deviation of the respective ends of fiber guides 6, 10 depends upon the relative inward or outward motions of the respective diaphragms 2, 20 and the consequent relative radial motions of the linking rods 9, 11. If the transducer device were used, for example, as a hydrophone just beneath the surface of a body of water, an impulse compression wave having a component propagating upward in the drawing would ideally first actuate diaphragm 20 and link rod 11 to move fiber guide 10 first up, then down. Having a wave length normally large in comparison with any dimension of the apparatus, the compression wave would almost simultaneously actuate diaphragm 2 and link rod 9 to move fiber guide 6 first down, then up. Further damped motions of the ends of each fiber 6, 10 may be caused depending upon the parameters of the situation, as will be appreciated by those skilled in the art. Small motions are assumed.

According to the invention, it is intended that the normally steady flow of light through input fiber guide 6, gap 22, and output fiber guide 10 will be modulated according to the relative displacement situation at gap 22 so as to convey output information via guide 10 for evaluation by available data processing means or for recording or for visual display in the conventional manner, for example. A novel optical displacement pick-off device may be employed within gap 22 for generating the desired amplitude modulated output light signal and is illustrated in one form in FIG. 2. It will be understood that the pick-off is versatile and may be used to measure any of various parameters that may readily be converted into small displacements of a movable element with respect to a fixed index or, as in the apparatus of FIG. 1, small relative motions between two movable elements.

Figure 2:
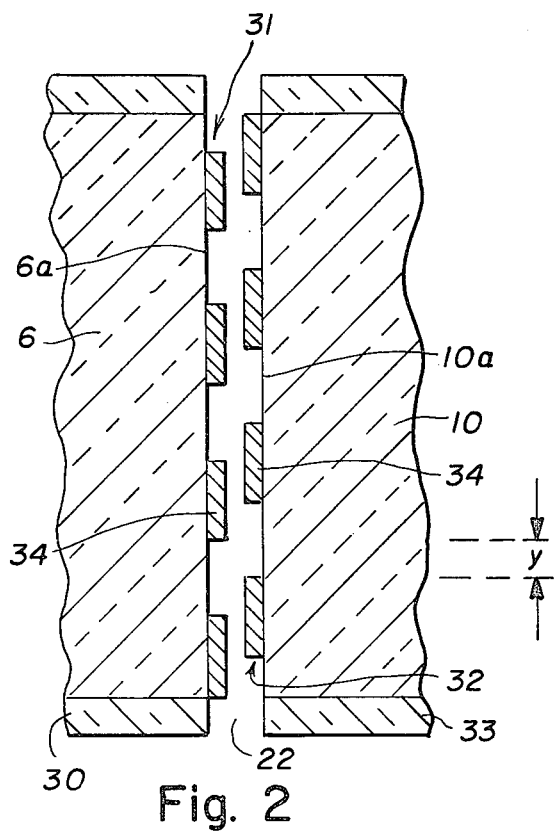
FIG. 2 is a fragmentary view in cross section of a portion of FIG. 1 illustrating a further feature of the invention on an enlarged scale.
Figure 3:
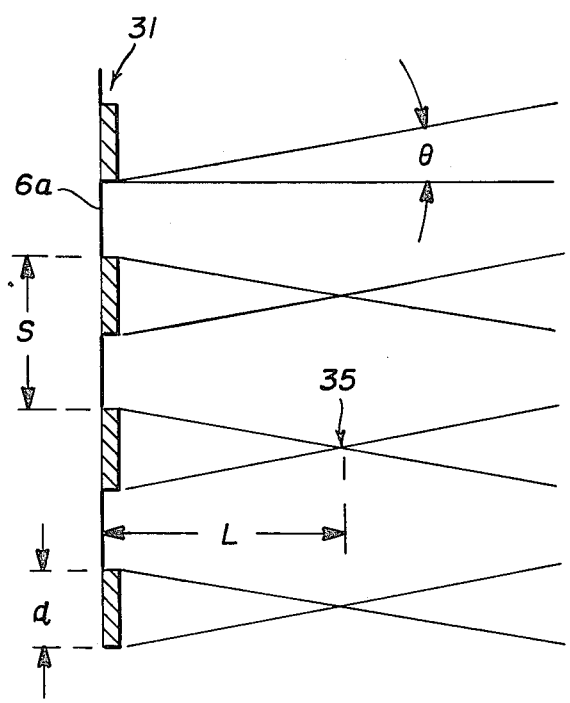
FIG. 3 is a diagrammatic representation useful in explaining the operation of the invention.

In FIGS. 2 and 3, the facing ends 6a, 10a of fibers 6, 10 and claddings 30, 33 at gap 22 may be constructed by the general method disclosed in the aforementioned Gravel patent application Ser. No. 71,893. Other methods of construction will be apparent to those skilled in the fiber optical guide art whereby it is arranged that the ends 6a, 10a of the optical fibers at gap 22 are optically polished to make fiber end faces 6a, 10a substantially perpendicular to the common quiescent axes of fibers 6, 10. Fibers 6, 10 are large core, large numerical aperture, multimode fibers. The preferred fibers are graded refractive index fibers wherein the optical index of refraction decreases as a function of the radial distance from the center of the fiber guide so as to avoid the adverse effects of pulse dispersion. Such multimode fiber guides are essential to the invention because they are compatible with the geometry of available light emitting diodes that are preferred light sources for use in propagating substantially monochromatic light into the input fiber guide 6. Additionally, connectors for use with multimode fiber guides are readily available on the market, while connectors for single mode guides are not widely available and will probably remain excessively expensive. Furthermore, the larger faces of the fiber core ends 6a, 10a more readily accommodate the optical pick-off of the present invention, permitting a preferred scale factor to be employed.

The pick-off system of FIGS. 2, 3 employs a technique wherein the positional sensitivity of the system is dependent only on the parameters of the pick-off system and is desirably independent of the fiber guide core diameter. In FIG. 2, the opposed fiber faces 6a, 10a are supplied with regular arrays 31, 32 of alternating transparent and opaque or absorbing stripes of substantially equal width. The opaque array elements, such as stripe 34, are formed of an opaque material such as a metal deposited through a mask. Other conventional methods, including photolithographic methods, may be employed. The stripes 34 deposited on each fiber end are mutually parallel, but the arrays are displaced (vertically in FIG. 2) by a distance equal to a quarter of the line-to-line spacing S (FIG. 3) of the stripes. While only four stripes are illustrated in FIG. 2 for each array 31, 32, it will be understood that many more stripes may be found useful in practice.

If fiber 6 in FIG. 2 is moved upward by the small distance S/4, the opaque portions of arrays 31 and 32 and the individual stripes 34 within them precisely overlap. Accordingly, half of the light propagating in input fiber 6 passes through gap 22 to be transmitted into or through fiber 10. On the other hand, if the end 10a of output fiber 10 is moved downward by S/4, the opaque stripe arrays are precisely interleaved so that substantially no light from input fiber guide 6 reaches output fiber guide 10.

From the geometry of FIG. 2, it will be clear that, ignoring diffraction effects, the pick-off is characterized by a minimum loss of 3 dB. For a relatively fine array with a small value of S, light diffraction induces an additional loss by converting light entering output fiber 10 into radiated modes. For preferred arrangements, the radiative losses may be neglected, so that a transverse relative displacement of S/2 causes the maximum change in output signal. By way of example, if S/2 is one micron, the positional sensitivity is 2.5 times as great as that achieved by the smallest available core, single-mode fiber of the aforementioned Gravel apparatus.

It will now be clear that the sensitivity of the pick-off is completely independent of core diameter. It will also be apparent that the transverse positioning tolerances of the fiber guide are relaxed, facilitating ease of manufacture. Simple arguments indicate that widths of the deposited stripes 34 as small as about two microns may usefully and reasonably be achieved. Assuming stripe widths large compared to the wave length of light and therefore that diffraction effects are small, FIG. 3 depicts the spreading of light from fiber guide 6 after passing through its associated array 31. The half spreading angle $\theta$ in radians is then for all practical purposes equal to the numerical aperture of fiber 6. For an array 31 of opaque and clear or transparent stripes of width S/2, the umbra length L is S/4$\theta$. If $\theta$ is 0.2 and S/2 is one micron, then L is 2.5 microns. Hence, the spacing between the fiber ends 6a, 10a must be well under 2.5 microns in order to approach the full modulation capability. To achieve such a close spacing, the ends of a 200 micron fiber guide must be polished perpendicular to the fiber axis with an accuracy better than one degree and polished flat to an accuracy better than one half a wave length of the operating light. For values of S large compared with one micron, device tolerances scale directly with the magnitude of the factor S. For values of S comparable to or smaller than the wave length of light, device tolerances scale quadratically with the magnitude of S, so that devices having S values less than two microns will be difficult to realize.

Diffraction limitations also depend upon the factor S. In terms of diffraction theory, the line spacing S creates multiple diffraction orders spaced in angle by $\lambda/S$. When S is two microns and $\lambda$ is 0.8 microns, the diffraction spreading angle is 0.4 radians; i.e., about twice that of the numerical aperture spreading. It is therefore again apparent that devices having stripe spacings less than two microns are relatively difficult to implement. It is seen that both geometric and diffraction aspects of the pick-off limit S values to be greater than about two microns.

Figure 4:
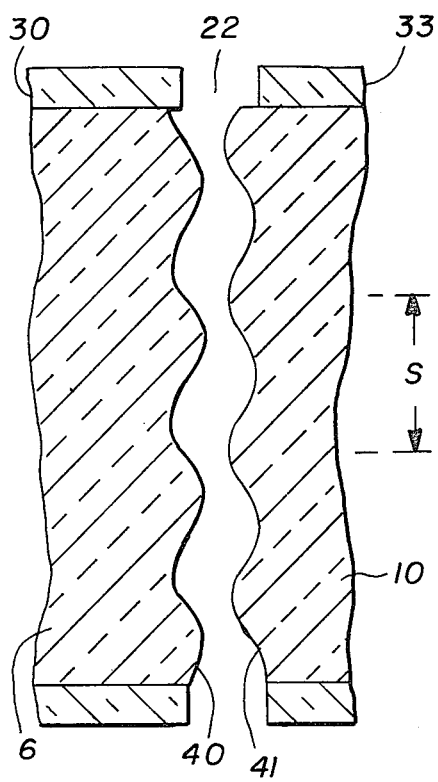
FIGS. 4, 5, and 6 are generally similar to FIG. 2, describing variations of the structure of FIG. 2.

A further embodiment of the invention allows one to overcome the inherent limitations of the FIG. 2 device that cause half the input light to be wasted by absorption and that may cause another significant fraction of the input light to be diffracted into radiating modes and thus be lost. In this embodiment, as shown in FIG. 4, the amplitude modulating arrays 31, 32 of absorbing stripes 34 are replaced by what is defined herein as phase grating arrays 40, 41. The phase gratings may be deposited by conventional means on the opposed end faces of guides 6, 10 or, as suggested by observation of FIG. 4, may be formed by an appropriately shaped scribe moved by a conventional ruling engine across the fiber faces. Other methods will be apparent to those skilled in the art. In FIG. 4, the phase gratings each form a regular sinusoidal or corrugated surface, the corrugations 40 of fiber guide 6 being displaced vertically in the figure by S/4 with respect to the corrugations 41 of fiber guide 10.

Assume in FIG. 4 that the light propagating through the thickest part of either phase grating suffers a phase retardation of 90° relative to light that traverses the thinnest portions. Furthermore, assume for simplicity that the fiber corrugated ends are themselves very closely spaced so that changes in light direction caused by refraction or diffraction can be ignored. If the corrugated end of fiber 6 is moved upward in the figure by S/4, the combined retardation of both phase gratings cancels so that there can be no net refraction or diffraction of light to alter the direction of light as it passes from fiber guide 6 into fiber guide 10. In this case, substantially all light carried by fiber guide 6 will enter and travel into fiber guide 10. If the corrugated end of fiber guide 10 is moved downward in the figure by S/4, a total relative phase retardation of 180° will result between the thickest and thinnest portions of the phase gratings. The net result is that substantially all light is diffracted out of the zero diffraction order into the $\pm 1$ and higher diffraction orders. With S equal to two microns, the diffraction angle of 0.4 radians takes all light out of the low loss fiber guide modes and places it in the high loss, radiating modes. Hence, for this second case, substantially no light can pass from fiber guide 6 into fiber guide 10. It will be apparent that other configurations approximating the corrugated surfaces of FIG. 4 may be used to achieve substantially the same results. For example, surfaces such at 44 and 45 in FIG. 5 made up of a regular succession of long transparent roof prisms may be employed, the roof apices of array 44 being displaced by S/4 with respect to the roof apices of array 45.

Figure 5:
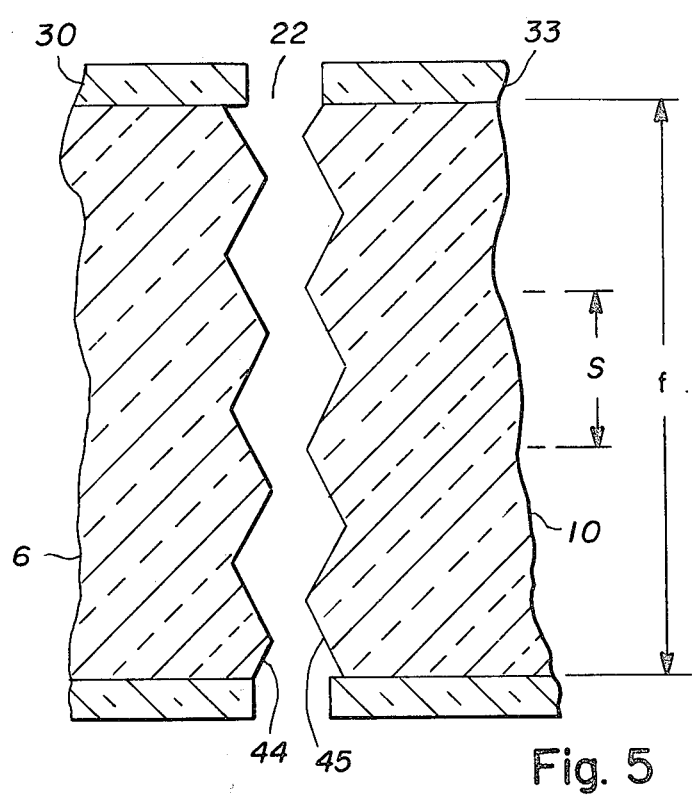
Figure 6:
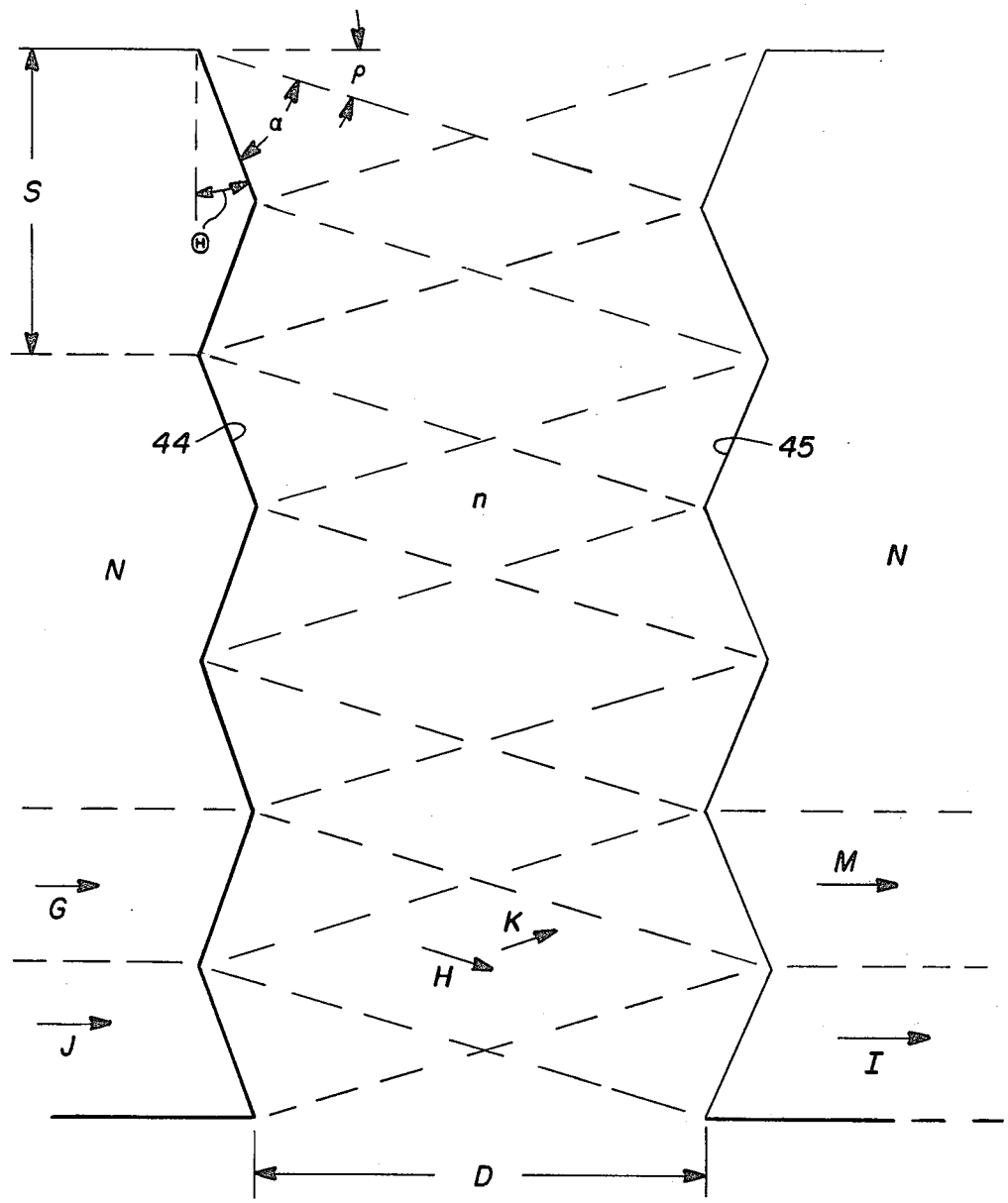

It will be instructive to examine FIG. 6 in order to obtain a more complete understanding of devices such as those of FIGS. 4 and 5; it should be observed that this understanding will be useful with respect to applications of amplitude and phase gratings in configurations yet to be discussed in connection with FIGS. 7, 7A. In FIG. 6, light normally incident on the corrugated face of phase grating 44 from the left will be refracted up or down through an angle $\rho$ depending upon the slope of the grating facet upon which it is incident. For example, a light bundle G will be refracted down as at H and will form bundle I upon traversing the corrugated face of grating surface 45. On the other hand, a light bundle J will be refracted upwardly as at K to form bundle M upon passing through the corrugated face of grating 45. The bundles G and J have, in effect, changed places. If the slope of each facet is Ⓗ with respect to normal incidence, if N is the index of refraction of the material of gratings 44, 45, and if n is the relatively lower index of refraction of the medium between gratings 44, 45, then the angle $\rho$ is determined by:

$$N \sin Ⓗ = n \sin (\rho + Ⓗ) \qquad (1)$$

In order to obtain one hundred percent modulation of the light as one grating is moved up or down relative to the other, the separation D between gratings 44, 45 must be an integral multiple of the distance S defined by:

$$D = Sp/2 \qquad (2)$$

for small values of Ⓗ. For light with a numerical aperture cone of ±0.01 radians, the distance D can approach a value one hundred times greater than S (neglecting minor diffraction effects). For example, if S<0.001 cm., D could be 0.01 cm. and 90 percent modulation would readily be attained as one grating is displaced relative to the other. It is seen that the important feature of the phase grating concept of FIG. 5 lies in the fact that the maximum theoretical lightflow through the sensor is one hundred percent as opposed to a maximum light flow only half as great for the absorption type of grating of FIG. 2. The lower optical loss improves the sensor sensitivity by 3 dB. Although theoretically more complex, the sinusoidal phase grating of FIG. 4 and other such devices likewise have fixed grating separations that yield optimum sensitivity with intermediate separations having zero sensitivity.

Figure 7:
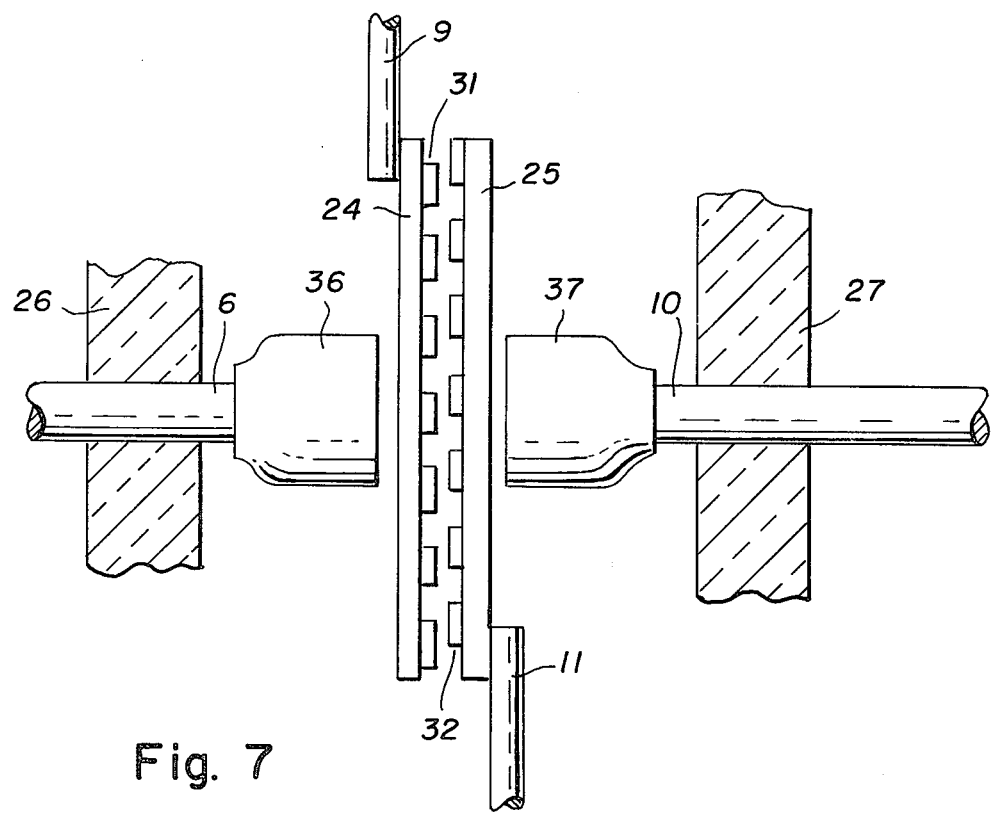
FIGS. 7 and 7A illustrate further variations of the structures shown in FIGS. 2 and 5.

A further embodiment of the invention appears in FIG. 7; here, fiber optical input and output guides 6 and 10 are rigid elements affixed in spaced opposition within walls 26, 27 which may be similar to walls 4, 8 of FIG. 1. Parallel transparent thin plates 24, 25 are disposed within the instrument, and are independently movable in a vertical sense, for example, being supported also by vertically movable rods 9, 11. The plates 24, 25 may be constrained to move in parallel vertical paths by the use of any well known parallel motion mechanism (not shown)

Decollimating (36) and collimating (37) lenses are affixed to the adjacent ends of optical fiber guides 6 and 10 and are beneficial for use in the preferred forms of the invention wherein the grating arrays are affixed to parallel movable plates 24, 25. Such collimating and decollimating lenses, particularly designed for use with optical fiber light guides, are widely described in the literature, including the R. A. Soref U.S. patent application Ser. No. 13,095, filed Feb. 21, 1979, entitled "Liquid Crystal Switching Matrices", and assigned to Sperry Corporation and the U.S. Pat. No. 3,894,789 to Kobayashi et al. The selected lens preferably has three features for use in the present invention: the lens length is a fourth of the wave guide pitch so as to image the fiber core source at infinity, the lens numerical aperture is greater than the core numerical aperture, and the lens outside diameter exceeds the fiber cladding diameter. Also of interest are the arrangements of the Holzman U.S. Pat. No. 4,119,362 and of the paper "Microlenses for Coupling Junction Lasers to Optical Fibers", *Applied Optics*, January 1974, page 89, by L. G. Cohen et al. Other conventional devices may be employed. Suitable devices may be purchased under the trade-name Selfoc from the Nippon Sheet Glass Company, 3 New England Executive Park, Burlington, Mass. As in FIG. 7A, it is seen that the collimating lens 36' may be supported at least in part by a ferrule 48 extending through a wall 26' generally similar to wall 26 of FIG. 7, the input fiber guide 6 extending through the ferrule 48. A similar ferrule arrangement and lens 37' would be used in association with the output fiber guide 10. One or both gratings 31, 32 may be movable.

Figure 7A:
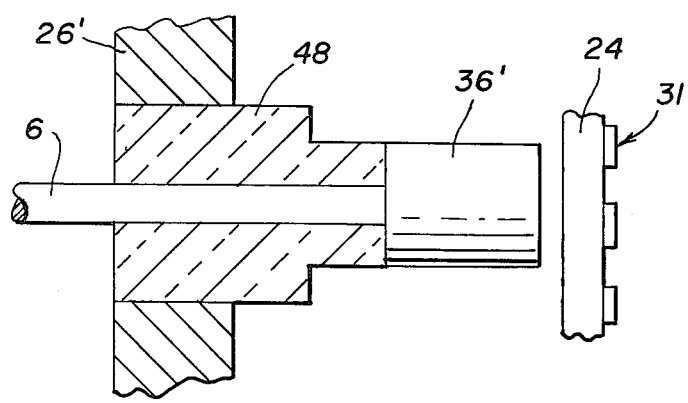

The use of lenses such as lenses 36, 37, 36', 37' is of particular benefit in the embodiments of FIGS. 7 and 7A. The lens 36 reduces the numerical apeture in one example from ±0.2 radians for a $10^{-2}$ centimeter diameter fiber guide to about ±0.10 radians. This reduction in the angular spread of light emitted by guide 6 conveniently allows a spacing as large as several centimeters between the adjacent ends of the graded index lenses 36, 37 without introducing a significant additional light loss, thereby providing improved sensitivity for the device. The large spacing is particularly beneficial because it allows the opposed gratings 31, 32 to be fabricated separately on the respective plates 24, 25 and assembled into the casing entirely apart from the fabrication of the fiber optical system itself. The spacing D between the opposed gratings 31, 32 in the device of FIG. 7 is no longer limited by the nature of the fiber numerical aperture to very small values. Large separations D are desirable both for coarse absorption gratings and for all phase gratings of the general types shown in FIGS. 4 and 5.

In this manner, optical fiber wave guide grating sensors are provided that detect motions small compared to the fiber core diameter; the grating sensor arrays may be attached to both fiber ends or to only one such end with the second grating fixed to the instrument casing. At least one of the gratings must be acted upon by the sonic or other disturbance to be monitored, such as a sound wave impacting a hydrophone, so as to cause a transverse motion of one grating relative to another whether or not physically coupled to a fiber end. Two fiber ends or two gratings are placed so that the relative small motions of the two grating arrays cause amplitude modulation of the amount of light transmitted from one fiber to the other. The gratings cause intensity or phase modulation of the light beam and may consist of stripe arrays, checkerboard patterns, or of other patterns having spacings substantially smaller than the diameter of the fibers.

Although not sensitive to acceleration, the device of FIG. 1, for instance, cannot distinguish between acoustic waves and pressure head applied to the instrument. It is therefore an object of the embodiments not to be discussed to provide a fiber optical hydrophone, for example, that is sensitive to acoustic pressure variations but not to pressure heads applied to the instrument and that is relative nonresponsive to flow noise. Wide ranges of pressure effects such as the effect of tides, ocean waves, and working depth variations may prevent universal use of apparatus like that of FIG. 1. Analysis shows that in wide range instruments, there is a conflict between factors yielding sufficient sensitivity to detect weak acoustic signals and the required insensitivity to large but slow pressure head variations. For maximum sensitivity, the greatest possible flexing of the diaphragm 2 of FIG. 1 for the least possible change in pressure is desired. On the other hand, to maintain the device operation within its linear range, displacements caused by the pressure head changes must be less than one grating stripe width.

Figure 8:
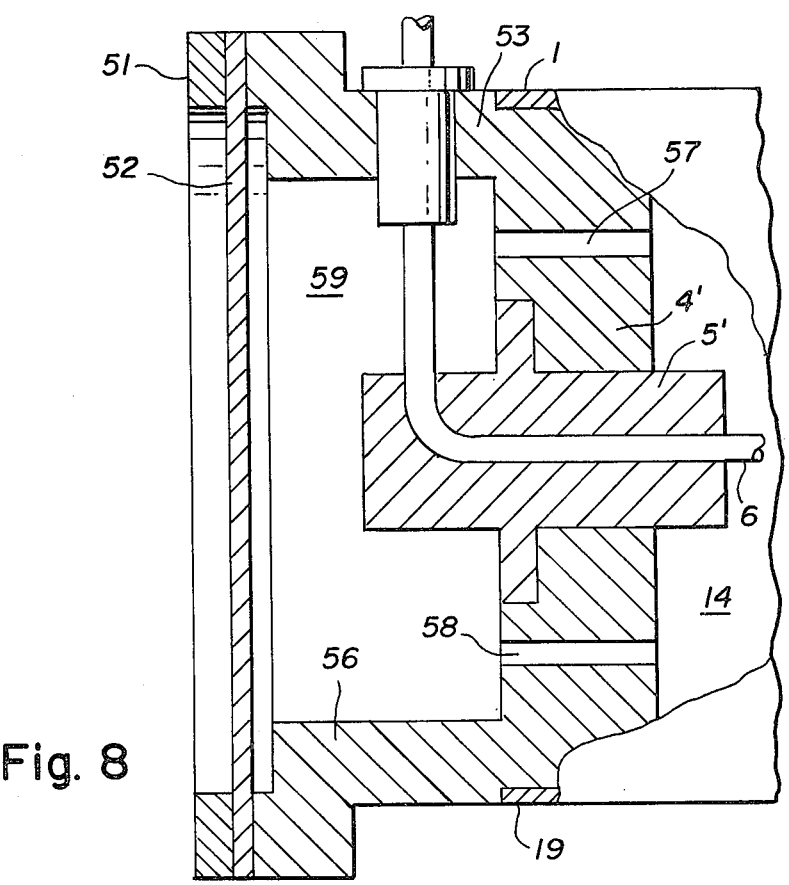
FIG. 8 is an elevation view in partial cross section of a variation of part of FIG. 1.

The modification of FIG. 1 shown in FIG. 8 acts to achieve the desired mechanism for relief of the pressure head variation problem. In the figure, the original cavity 14 and its associated parts are the same as those of FIG. 1. The centrally located ferrule 5' extending through end wall 4' into a further cavity 59 permits light guide 6 to exit cavity 59, wall 4' being extended by a wall 53 forming part of an enclosure about the second cavity 59. Cavity 59 is completed by a flexible diaphragm 52 also exposed to the medium in which the hydrophone is operated and fastened to wall 53 by ring shaped clamp 51. Two or more small bores 57, 58 extend through wall 4' to connect cavity 59 to cavity 14. A suitable damping fluid fills cavities 14, 59 and bores 57, 58.

The pressure head relief mechanism formed within cavity 59 has a time constant quite long with respect to the lowest frequency to be detected by diaphragms 2, 20, making use of the more compliant membrane 52 attached at its periphery by clamp 51 to casing wall 53. If the pressure head external of the instrument increases, the unequal pressures on each side of diaphragm 52 force fluid from cavity 59 through bores 57, 58 into cavity 14, thereby relieving the pressure head differential on the several diaphragms. The size of bores 57, 58 and the volumes 14 and 59 are so selected as to create a suitable time constant (0.1 to 10 seconds) for relief of the undesired pressure head effect within chamber 14. While the pressure head mechanism may not always completely null out pressure head changes, it does so to a sufficient degree for many purposes. The use of the closed dual cavities and the inert damping liquid they contain prevents corrosion of the interior of the instrument by the exterior medium.

For greater versatility, a further embodiment of the invention deserves attention; such an embodiment maintains sensitivity even though the linear range of a simple transducer like that of FIG. 2 is exceeded. Since sensitivity is measured over large displacements, assembly tolerances are greatly eased. In the FIG. 9 device, which is drawn in exaggerated proportions, mounting clamp 60 holds fixed the grating array (32) end of output fiber guide 10', while it clamps the input fiber guide 6 at a location remote from link rod 9 and remote from the input grating array 31 near gap 22. It is readily seen that the amplitude of light traversing gap 22 into the fixed output fiber guide 10' may be a function of $1+\sin(\pi y/d)$, where y is the relative displacement between the patterns of gratings 31, 32 and d is the width of one opaque stripe or of one transparent stripe of the grating. It will furthermore be readily apparent that the sensor is linear if $y << d$. However, the sensor sensitivity is zero if:

$$y/d = \pm i \qquad (3)$$

where i is any integer. In the present embodiment, a second sensor like that of FIG. 2 is introduced, but its gratings are so disposed that their cooperative response is $1+\cos \pi y/d$, the two fibers being moved in common by like rod 9. For example, as in FIGS. 9 and 10, consider that grating 32 is fixed and that it cooperates with both of the movable gratings 31, 31'. When the sensor channel associated with grating 31 has a zero light transmission response, the second sensor channel associated with grating 31' has a maximum light transmission response. It is seen that the information propagating through the two channels may be subjected to time delay multiplexing and to whatever additional conventional data processing may be required. It is seen that gratings 31, 31' may actually be one continuous grating, since fibers 6, 6' move together, and that the gratings 31, 31' are slanted with respect to grating 32 by a small angle $\beta$ for effecting the desired phase quadrature output. Angle $\beta$ is such as to produce a one half stripe shift between the arrays in the areas of fibers 31, 31'. If f is the fiber diameter, then:

$$\beta = d/2f \qquad (4)$$

Suppose such a phase quadrature sensor, as will be further described in connection with FIGS. 11 and 12, is excited by an acoustic wave at link 9 that causes a displacement y of the fiber guide end:

$$y = a \cos(\omega t) \qquad (5)$$

where $a << S$, and that a static displacement Y is caused by the steady pressure head of the associated medium. Then, the outputs of the two channels of the sensor combination are:

$$I_1 \sim 1 + \cos[(\pi/S)(Y + a \cos(\omega t))] \qquad (6)$$

$$I_2 \sim 1 + \sin[(\pi/S)(Y + a \cos(\omega t))] \qquad (7)$$

For the normal condition, $a << S$, so that Equations (6), (7) may be simplified:

$$I_1 \sim 1 + \cos\left(\frac{\pi Y}{S}\right) + \left(\frac{\pi a}{S}\right)\sin\left(\frac{\pi Y}{S}\right)\cos \omega t \qquad (8)$$

$$I_2 \sim 1 + \sin\left(\frac{\pi Y}{S}\right) + \left(\frac{\pi a}{S}\right)\cos\left(\frac{\pi Y}{S}\right)\cos(\omega t) \qquad (9)$$

In the latter equations, the terms $1+\cos(\pi Y/S)$ and $1+\sin(\pi Y/S)$ suffice to determine Y modulo 360°, being static or pressure head terms. Once Y is determined, the alternating or acoustic portion of the signals $I_1$ and $I_2$ may be divided by $\sin(\pi Y/S)$ and $\cos(\pi Y/S)$ to get $(\pi a/S)$ unambiguously.

Figure 9:
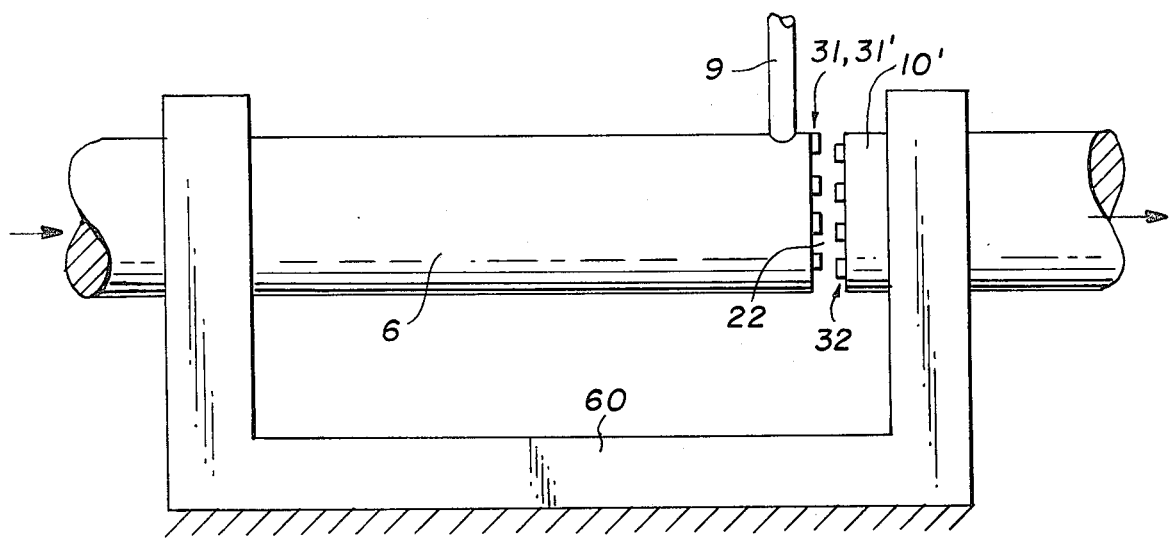
FIG. 9 is a simplified elevation view of an alternative of the FIG. 1 structure.
Figure 10:
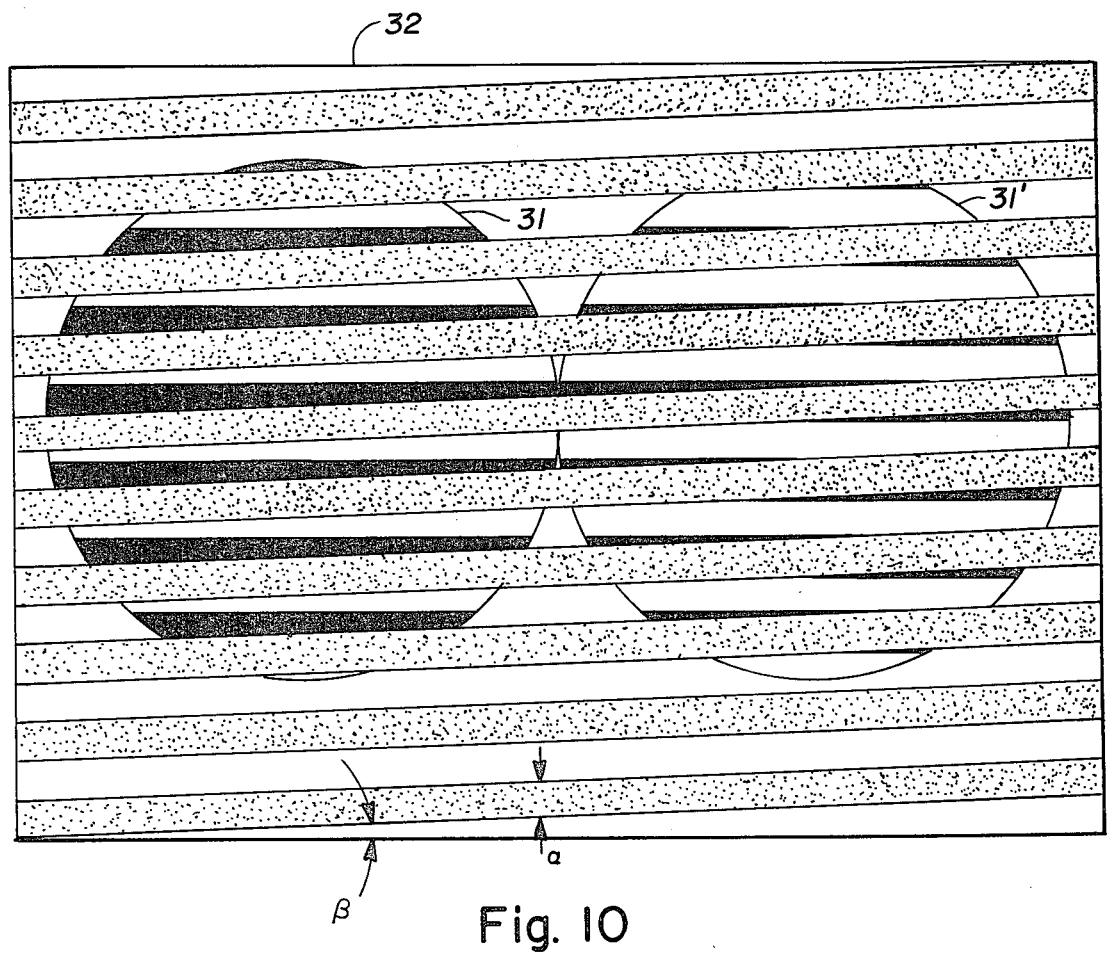
FIG. 10 is a face view of the ends of the fiber optic wave guides of FIG. 9 showing the disposition of cooperating stripe arrays.

A more complete visualization of the configuration shown in FIG. 9 is afforded in FIGS. 11 and 12. In FIG. 11, the opposed diaphragms 70, 70' of FIG. 12 having been removed, the side-by-side disposition of fibers 6, 6' is readily seen. The movable ends of fibers 6, 6' are provided with the common grating 31, 31' and are moved in common by link rod 69 and flexible diaphragm 70. The alternative disposition of gratings shown in FIG. 4 may be used. The fibers 6, 6' both pass in sealed relation through a ferrule 63 mounted in casing 64. The extension 62 of fiber optic guide 6 includes a delay section 60a before it joins at 82 the extension 62' of fiber optic guide 6' to form a single guide 61 conveying data to a suitable multiplexer and data processing and utilization system. While transmission of light through an absorptive grating affixed to the insert 65 of casing 64 may be employed, it is preferred in this embodiment to use a reflection grating array at 32 affixed to the flat surface of insert 65. In this manner, light input and output signals pass in and out only through one side of casing 64. The combined return signal found within guide 61 and then guide 61a is first detected by photodetector 80, whose output is then processed as follows before application to a utilization device 95 such as an oscillograph plotting signal amplitude versus time, for example. For optical excitation of the device, a light source 81 is coupled by guide 61b by a Y-junction 83 to the common guide 61.

In more detail, the device of FIGS. 11 and 12 functions as follows. The light source 81 emits pulses of duration $\tau$ followed by periods T during which no light is produced, being under the control of an appropriate pulser 94. These light pulses are injected into the common fiber guide 61 by a Y-coupler 83 and are sent via fiber guide 61 into the sensor. The train of input light pulses is split equally by Y-coupler 82 so that half of the light is modulated by the grating pair 31', 32 and half is later modulated by the grating pair 31, 32. Input pulses to be reflected at gratings 31, 32 arrive back at Y-coupler 83 later than the pulses reflected at gratings 31', 32 by a time delay $t = 2sn_L/c$. Here, s is the effective length of delay loop 60, $n_L$ is the index of refraction of the glass of loop 60, and c is the velocity of light therewithin. If the time delay $t > \tau$, two fully resolved pulses are propagated back toward photodetector 80, one pulse whose intensity is proportional to Equation (6) and one pulse whose intensity is proportional to Equation (7). These two pulses, after being received through Y-junction 83 by photodetector 80 may be time-division multiplexed, as aforementioned, by a conventional multiplexer under control of the synchronizing pulser 94 and photodetector 80, providing a plurality of outputs supplied by a plurality of leads coupled to conventional utilization apparatus 95 for processing in the conventional manner.

As is also the case in other embodiments in this disclosure, it will be understood as in FIG. 12A that the two or more fiber optical guides 62, 62' may be held at stationary by ferrule 63 within the casing and that the gratings 31, 31' may be moved with respect to the fixed slanted grating 32. The linkage 69 is now provided to move grating or gratings 31, 31' vertically in response to pressure or other changes coupled through diaphragm 70 and linking rod 69, for example.

Figure 13:
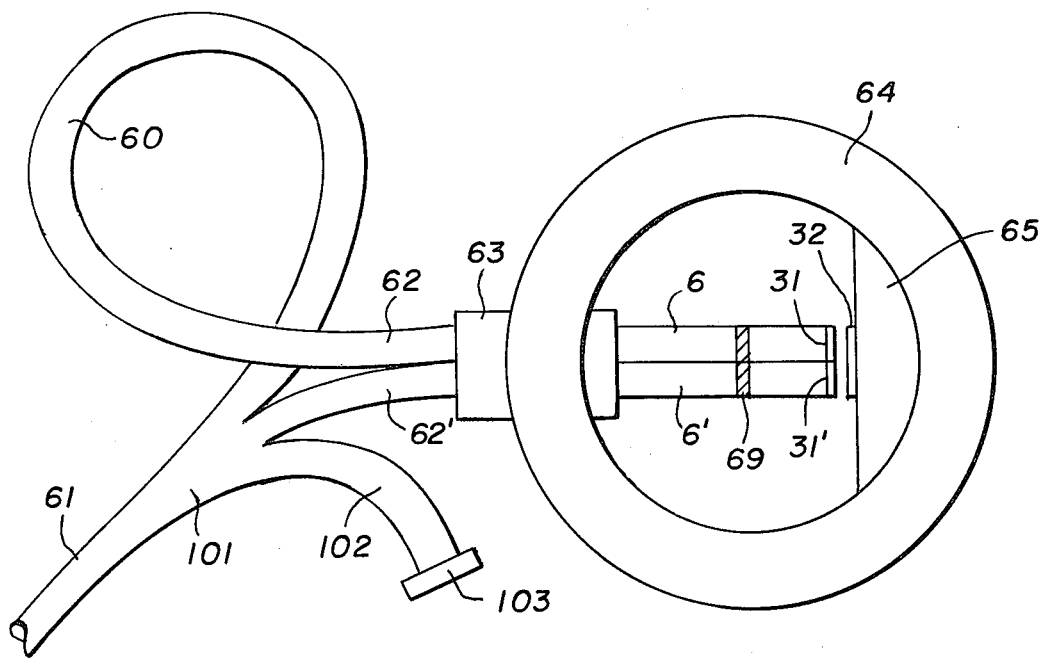
FIG. 13 is a partial view of an alternative of FIGS. 11 and 12.

In the alternative form of FIG. 11 shown in FIG. 13, similar structures are disclosed with the exception that a branching fiber 102 coupled by the triple junction 101 to guide 61 is provided. At its end, a reflecting mirror 103 is located. Pulses of light thus reflected back into fiber guide 61 may be detected by photodetector 80 of FIG. 11 and used as reference pulses in the operation of a conventional keyed multiplexer at 93. Self-synchronizing multiplexer apparatus may alternatively be used. The three-way splitter 101 provides the further branch arm 102 for guide 61. Fiber guide 102 provides a reflected reference level signal for photodetector 80 in view of the reflecting mirror 103. The reflected reference signal may be used in dividing out and thus eliminating from consideration non-acoustically produced light signal variations; i.e., multiplicative factors not explicitly contained in Equations (6) and (7).

It will also be understood that other multi-terminal multiplexer apparatus may be employed with the present sensors, including the multiplexer concepts disclosed in the D. H. McMahon pending U.S. patent application Ser. No. 114,914, filed Jan. 24, 1980, entitled: "Multiple Terminal Passive Multiplexing Apparatus" and assigned to Sperry Corporation.

In the apparatus of FIGS. 9 through 13, any event causing variation in the detector output or the light source 81, varying optical losses, changes in circuit gain, and the like contributes fractional uncertainties in the static terms of Equations (8) and (9). Where static terms must be measured precisely, it is preferable to avoid such problems by using differential measurement techniques. For example, the device of FIG. 14 employs four fiber light guides 97 through 100 in a configuration generally similar to that of FIG. 9 and where ends of the light guides are simultaneously moved by a mechanical link 69 via its branching extensions 96. Although not specifically shown, each of the four guide extensions differs in length so as to create unique time delays between the light source pulses and the four pulses received from each modulating guide of the device as shown generally in FIG. 11. Also, the grating common to the free ends of light guides 97 through 100 is again tilted by the aforementioned angle $\beta$ with respect to the fixed grating 32, which may be a reflection grating. A single photodetector and multiplexer device maybe employed and a single light source in a system generally similar to that of FIG. 11, except that now four distinct delays are required.

Figure 14:
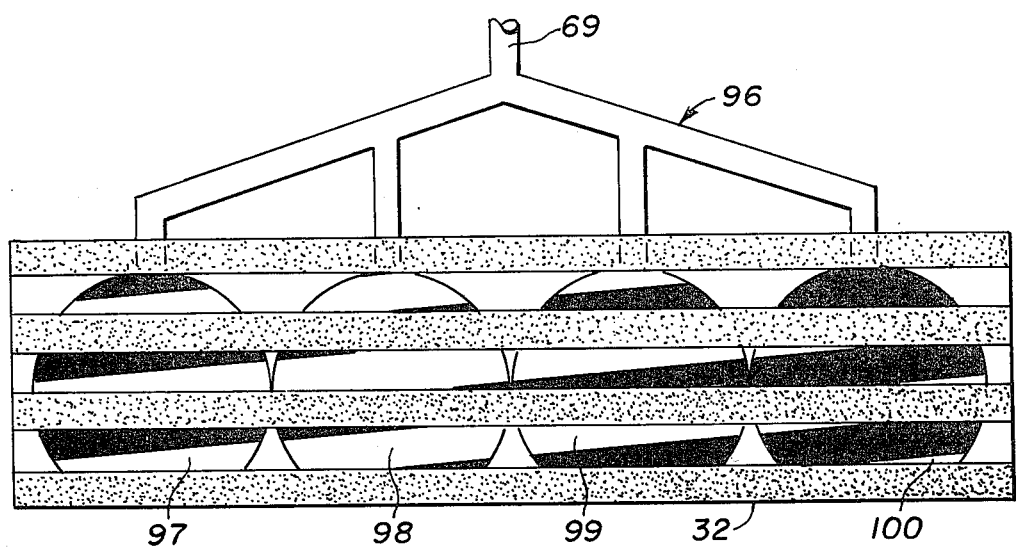
FIG. 14 is a plan view of a variant of the embodiment of FIG. 11.

It is again assumed in FIG. 14 that the free ends of the light guides or the gratings themselves undergo a static displacement Y and an acoustic wave displacement $y = a \cos \omega t$. The stripe-to-stripe width (FIG. 3) of the grating is taken to be S and the gratings 31, 32 are sufficiently separated that a sine-like response is achieved as a function of grating displacement y. For the four-fiber hydrophone of FIG. 14, the signal levels returned to photodetector 80 are:

$$I_1 = E(1 + \sin(\pi(y+Y)/D)) \tag{10}$$

$$I_2 = E(1 - \sin(\pi(y+Y)/D)) \tag{11}$$

$$I_3 = E(1 + \cos(\pi(y+Y)/D)) \tag{12}$$

$$I_4 = E(1 - \cos(\pi(y+Y)/D)) \tag{13}$$

Combining Equations (10) and (11) and then combining Equations (12) and (13) yields the identities:

$$A \equiv (I_1 - I_2)/(I_1 + I_2) = \sin(\pi(y+Y)/D) \tag{14}$$

$$B \equiv (I_3 - I_4)/(I_3 + I_4) = \cos(\pi(y+Y)/D) \tag{15}$$

Set:

$$\sin \pi Y/D \equiv F \tag{16}$$

$$\cos \pi Y/D \equiv C \tag{17}$$

Also, assuming $(Y/D) << 1$ and small angles, well known trigonometric identities yield:

$$A \cong F + \pi y(C/D) \tag{18}$$

$$B \cong C - \pi y(F/D) \tag{19}$$

Multiply Equation (18) by the factor C and Equation (19) by the factor F. Subtracting one from the other results in $$\frac{\pi y}{D}(C^2 + F^2) = AC - BF \tag{20}$$

Use of Equations (16) and (17) with trigonometric identities shows that the factor $(C^2 + F^2)$ of Equation (20) is equal to unity. Because y in Equations (7) and (8) is a signal at an acoustic frequency; i.e. 100 Hz to 2 KHz, the value F represents the value of A when passed through a low pass filter, while the value C represents the value of B when passed through a low pass filter.

Figure 15:
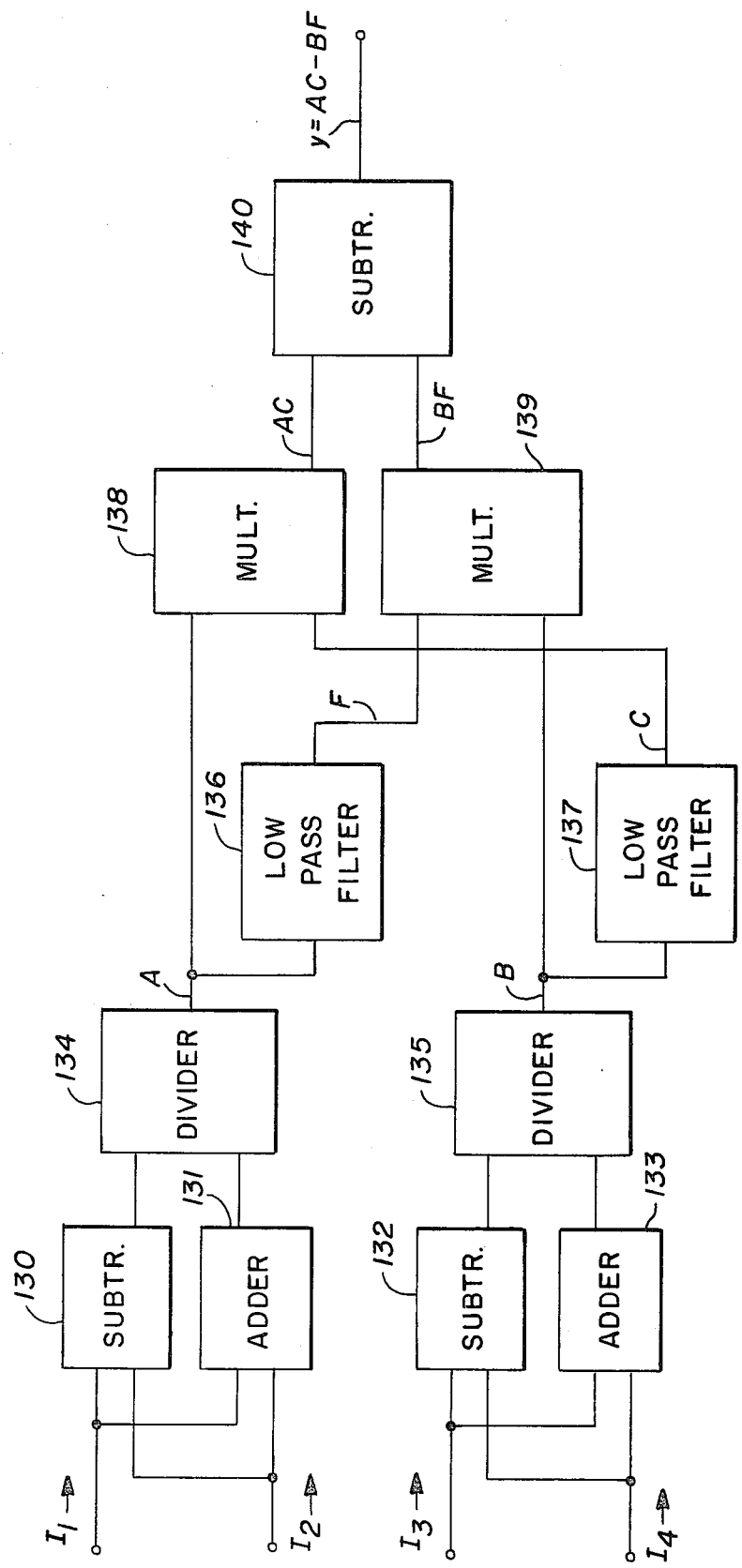
FIG. 15 is a wiring diagram of a data processing system for use with the apparatus of FIG. 14.

Accordingly, the desired acoustic output signal is derived, for example, using the apparatus of FIG. 15. It is assumed that the signals $I_1$, $I_2$, $I_3$, and $I_4$ are derived as individual signals by multiplexing or by the use of four discrete photodetectors in cooperation with the quadruple grating and fiber systems of FIG. 14. The signals $I_1$ to $I_4$ may be processed using analog or digital elements, as desired.

In the system of FIG. 15, Equation (20) is solved first by subtracting the value $I_2$ from the value $I_1$ in a conventional subtracter circuit 130. Likewise, the sum $I_1+I_2$ is obtained from a conventional adder 131. The difference value from circuit 130 is divided by the sum value from circuit 131 in the conventional divider circuit 134 to produce signal A. Next, the value $I_4$ is subtracted from the value $I_3$ in a subtracter 132 similar to subtracter 130 and $I_3$ and $I_4$ are added in an adder 133 similar to adder 131. The difference value from circuit 132 is divided by the sum value from circuit 133 in a divider 135 similar to divider 134 to produce signal B. A pair of similar conventional multipliers 138, 139 is provided. A direct input to multiplier 138 is the value A, while the other is the filtered, low frequency value C obtained by passing value B through low pass filter 137. A direct input to multiplier 139 is the value B, while the other is the filtered, low frequency value F obtained by passing the value A through low pass filter 136. The respective outputs AC and BF of multipliers 138, 139 are subtracted in a conventional subtraction device 140 to yield the desired output $(\pi y/D)=$ AC-BF. While it is convenient to use four fiber guides as in FIG. 14, it should be understood that only three simultaneously driven optical fibers are needed to define the desired output signals.

Figure 16:
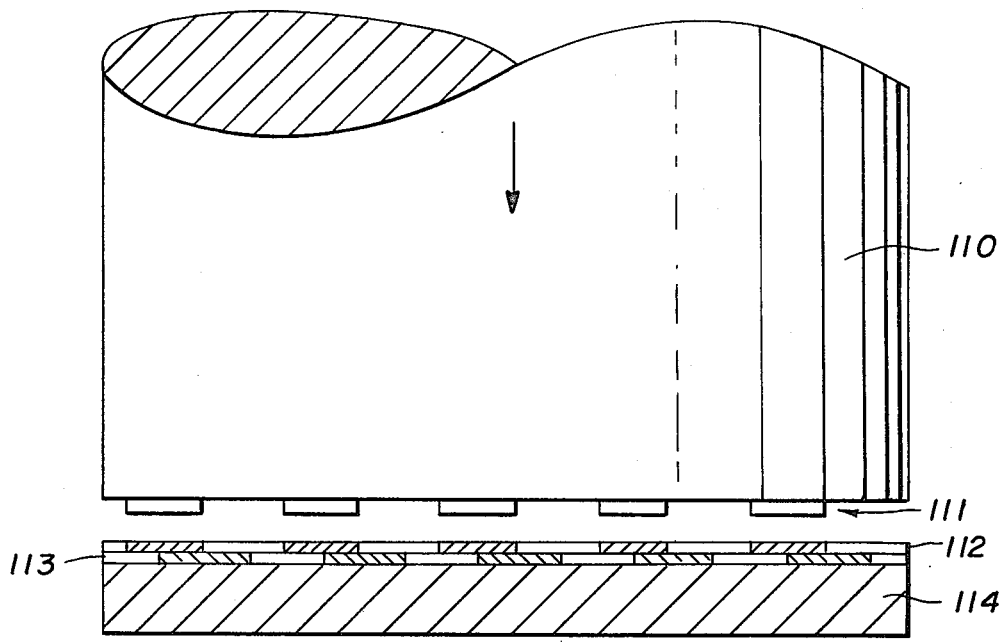
FIG. 16 is a fragmentary view of a form of the invention using two colors of light.

A further embodiment of the invention employing the phase quadrature effect uses a single fiber guide 110 as illustrated in FIG. 16 with wave length multiplexing; i.e., two light sources emitting different wave lengths. Fiber 110 is supplied at its free end with a regular array 111 of stripes which are light absorbing. The equal-width intervening stripes are light transmitting. Spaced apart and normally parallel to grating 111 is a composite grating mounted on a substrate 114. Affixed to the face of substrate mirror 114 is a first regular array 113 formed of stripes of a first absorbing material with intervening transparent stripes. Affixed to the face of array 113 is a second regular array 112 formed of stripes of a second absorbing material with intervening reflector stripes. Array 112 is displaced by the distance d/2 with respect to array 113. Array 112 absorbs at wave length $\lambda_1$, while array 113 absorbs at a separated $\lambda_2$. The narrow band absorbing filter array 112 lies in a regular manner just opposite the pattern of stripes on guide 110 when the latter is at rest. As in the previously discussed embodiments, it may be preferred that fiber guide 110 is rigidly fixed with respect to the instrument casing, and that one or the other or both of the grating systems be translated according to the parameter to be measured. Substrate 114 may be translated, thus translating gratings 112, 113. Grating 111 may be mounted on a transparent substrate and thus made movable independent of fiber guide 110.

Figure 17:
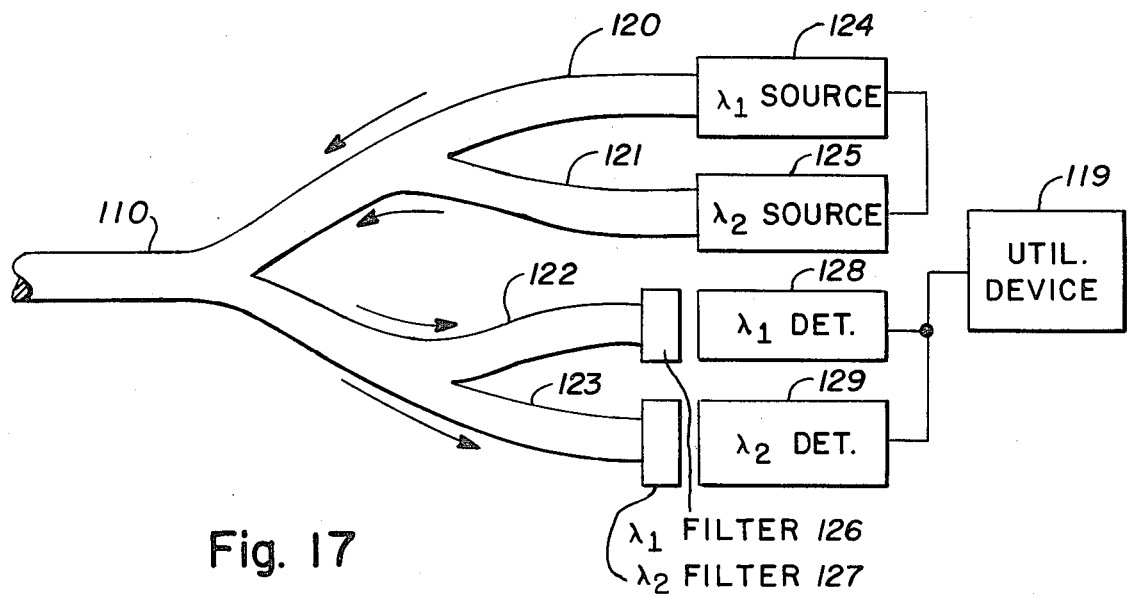
FIG. 17 is a view of optical elements cooperating with the apparatus of FIG. 16.

The two mutually spatially offset color filter arrays 112, 113 are deposited in a phase quadrature relationship on the backing mirror substrate 114. Also, one color ($\lambda_1$) produces the desired $1+\cos(\pi Y/d)$ signal and the other color ($\lambda_2$) produces the $1+\sin(\pi y/d)$ signal, as shown in FIG. 17. In more detail, it is seen in FIG. 17 that light sources 124, 125 operate at distinct optical wave lengths $\lambda_1$ and $\lambda_2$ and respectively feed light through guides 120, 121 and through Y-couplers into the guide 110 itself. Signals modified by the interactions of gratings 111, 112, 113 return through fiber guide 110 and successive Y-couplers to optical fiber guides 122, 123 capped respectively by $\lambda_1$ and $\lambda_2$ narrow pass band filters 126, 127 so that only $\lambda_1$ energy is injected into $\lambda_1$ photodetector 128 and only $\lambda_2$ energy is injected into $\lambda_2$ photodetector 129. The detected signals may be manipulated in the conventional manner in utilization equipment 119.

Accordingly, it is seen that the invention provides opto-electronic transducer means for converting small displacements, pressure changes, or the like into optical intensity or phase variations and then, if desired, into varying electric currents. The required tolerance of alignment of the cooperating fibers is readily reduced by a factor of one hundred, thus greatly decreasing manufacturing cost. In a typical design, sensitivity is increased by 30 dB. A sensor constructed according to the present invention demonstrates an acoustic sensitivity greater than is available in the prior art single-mode fiber device and, at the same time, retains other beneficial features inherent in propagation in large area, large numerical aperture, multimode optical fiber wave guides. The multimode fibers used also permit use of low cost electroluminescent light sources and readily available connector technology.

While the invention has been described in its preferred embodiments, it is to be understood that the words that have been used are words of description rather than of limitation and that changes within the purview of the appended claims may be made without departing from the true scope and spirit of the invention in its broader aspects.

What is claimed is:

1. Optical transducer means including:
   mounting means having at least first casing means with an inert damping fluid disposed therewithin, said first casing means including first pressure sensing diaphragm means which has a first time constant,
   first optical wave guide means disposed upon said mounting means and having a first longitudinal axis and a first end face,
   second optical wave guide means disposed upon said mounting means and having a second longitudinal axis and a second end face,
   said first and second axes being normally coincident at least in the unexcited state of said transducer means, whereby said first and second end faces then lie in substantially parallel relation and form a gap therebetween,
   first and second regular grating array means interposed in substantially parallel spaced relation within said gap substantially perpendicular to said first and second longitudinal axes, and
   suspension means adapted to permit relative displacement between said first and second regular grating array means in response to deflections of said first pressure sensing diaphragm means for modulation of light passing through said first and second regular grating array means.

2. Apparatus as described in claim 1 wherein said first and second regular grating array means are disposed in mutually off-set relation in the unexcited state of said transducer means.

3. Apparatus as described in claim 1 wherein at least said first optical wave guide means comprises multi-mode optical fiber wave guiding means of the graded refractive index kind.

4. Apparatus as described in claim 1 wherein said first and second regular grating array means are each formed by alternate transparent and opaque stripes of substantially equal widths.

5. Apparatus as described in claim 4 wherein corresponding opposed ones of said opaque stripes overlap when viewed along said first and second axes in the unexcited state of said transducer means by one half said opaque stripe width.

6. Apparatus as described in claim 1 wherein said first regular grating array means is formed by a first repetitive pattern of parallel grooves disposed in the said first end face of said first optical wave guide means.

7. Apparatus as described in claim 6 wherein said second regular grating array means is formed by a second repetitive pattern of parallel grooves disposed in said second face of said second optical wave guide means.

8. Apparatus as described in claim 7 wherein said first and second repetitive patterns are disposed in mutually parallel relation.

9. Apparatus as described in claim 8 wherein opposed ones of said parallel grooves overlap when viewed along said first and second axes in the unexcited state of said transducer means by one half the width of each said parallel grooves.

10. Apparatus as described in claim 9 wherein each said parallel groove displays a sinusoidal cross section.

11. Apparatus as described in claim 9 wherein each said parallel groove displays a generally triangular cross section.

12. Apparatus as described in claim 9 wherein each said parallel groove displays a generally sinusoidal cross section.

13. Apparatus as described in claim 1 wherein said mounting means further includes second casing means having second pressure sensing diaphragm means which has a second time constant greater than said first time constant of said first pressure sensing diaphragm means.

14. Apparatus as described in claim 13 wherein said inert damping fluid is additionally disposed within said second casing means, said first and second casing means being coupled by at least one restricted bore.

15. Apparatus as described in claim 1 wherein said suspension means is coupled to at least one of said first or second regular grating array means for displacement thereof.

16. Apparatus as described in claim 15 wherein at least said first regular grating means is affixed at the end face of said first optical wave guide means.

17. Apparatus as described in claim 15 further including collimating lens means with a first face thereof affixed at said first end face of said first optical wave guide means and a second face thereof affixed to said first regular grating means.

18. Apparatus as described in claim 15 further including collimating means with first and second faces, said first face affixed at said end face of said first optical wave guide means, and wherein said first regular grating means is spaced from said second face of said collimating lens means and suspended only by said suspension means.

19. Optical transducer means including:
mounting means,
at least first and second optical wave guide means having side-by-side parallel axes and first and second co-planar ends perpendicular to said axes,
regular reflective grating array means including a plurality of reflective stripes each spaced apart by an absorptive stripe, said reflective and absorptive stripes offset by an angle $\beta$ $$\beta = d/2f$$

where f is a diameter of said optical wave guide means and d is a stripe width, affixed to said mounting means and spaced in parallel relation from said co-planar ends for forming a gap,
regular absorptive grating array means, including a plurality of absorptive stripes and a substantially similar plurality of transparent stripes, the absorptive and transparent stripes each having the same width d, and arranged to form an alternating pattern of absorptive and transparent stripes, said transparent and absorptive stripes offset by an angle $\beta$ $$\beta = d/2f$$

where f is a diameter of said wave guide means, interposed within said gap,
suspension means adapted to permit relative displacement between said regular reflective and absorptive grating means,
source means for propagating light at least into said first and second optical wave guide means for reflection at said regular reflective grating array means, and
receiver means coupled at least to said first and second optical wave guide means for detecting modulation of light reflected by said regular reflective grating array means in response to said displacement.

20. Apparatus as described in claim 19 wherein said regular reflective and absorptive grating array means are disposed in mutually offset relation in the unexcited state of said transducer means.

21. Apparatus as described in claim 19 wherein at least said first optical waveguide means comprises multimode optical fiber wave guiding means.

22. Apparatus as described in claim 21 wherein corresponding opposed ones of said absorptive stripes of said regular reflective and said regular absorptive array means overlap when viewed along said parallel axes in the unexcited state of said transducer means by one half said absorptive stripe width.

23. Optical transducer means including:
closed cavity means having wall means,
at least first and second optical wave guide means passing through said wall means at a region of entry in generally parallel diametric relation and having substantially co-planar ends within said closed cavity means,
regular reflective grating array means affixed within said closed cavity means opposite said region of entry and forming a gap in cooperation with said co-planar ends,
regular absorptive grating array means interposed within said gap in spaced parallel relation with said regular reflective grating means and said co-planar ends,
suspension means adapted to permit relative displacement between said regular reflective and absorptive grating means,
source means for feeding light into said first and second optical wave guide means,
branching optical wave guide means coupled to said first and second optical wave guide means for receiving reflected light amplitude modulated as a function of said displacement.
optical delay means coupled to said first optical wave guide means
third optical wave guide means,
first coupler means for coupling said optical delay means and said second optical wave guide means to said third optical wave guide means,
second branching coupler means coupled to said third optical wave guide means and having first and second branches, said light source means being coupled to said first branch, and utilization means coupled to said second branch for utilizing said reflected, amplitude modulated light.

24. Apparatus as described in claim 23 wherein said light source means includes:
synchronizing pulse generator means, and
substantially monochromatic light source means responsive to said synchronizing pulse generator means and coupled to said first branch.

25. Apparatus as described in claim 24 wherein said utilization means includes:
photodetector means responsive to said second branch, and
multiplexer means responsive to said photodetector means and to said synchronizing pulse generator means.

26. Apparatus as described in claim 23 additionally including:
third optical wave guide means,
first coupler means for coupling said optical delay means and said second optical wave guide means to said third optical wave guide means,
second branching coupler means coupled to said third optical wave guide means and having first, second, and third branches,
said light source means being coupled to said first branch,
utilization means coupled to said second branch for utilizing and reflected, optically modulated light, and
mirror means coupled to said third branch for providing synchronizing pulses within said utilization means.

27. Optical transducer means including:
mounting means,
a plurality of optical wave guiding means disposed in parallel relation with respect to said mounting means and having ends lying in a common plane at least in the unexcited state of said optical transducer means,
regular reflective grating array means affixed to said mounting means and forming a gap in cooperation with said coplanar ends,
regular absorptive grating array means interposed within said gap in spaced parallel relation with said regular reflective grating means and said coplanar ends,
suspension means adapted to permit relative displacement between said regular reflective and absorptive grating means,
pulsed source means for feeding light into said plurality of optical wave guiding means,
branching optical wave guiding means coupled to said plurality of optical wave guiding means for receiving reflected light amplitude modulated as a function of said displacement,
utilization means for utilizing said reflected, amplitude modulated light, and means coupled to said source means for successively incrementally delaying each optical pulse of said pulsed source means when coupled to successive ones of said plurality of wave guiding means.

28. Apparatus as described in claim 27 wherein said pulsed source means includes:
synchronizing pulse generator means, and
substantially monochromatic light source means responsive to said synchronizing pulse generator means.

29. Apparatus as described in claim 28 wherein said utilization means includes:
photodetector means responsive to optical signals incident thereto from said branching optical wave guiding means, and
multiplexer means responsive to signals incident thereto from said photodetector means.

30. Apparatus as described in claim 29 wherein said optical transducer means includes a plurality of at least four optical wave guiding means for generating first, second, third, and fourth quadrature signals representative of said displacement, said apparatus further including:
first computer means responsive to said first and second quadrature signals for producing a first quotient signal,
second computer means responsive to said third and fourth quadrature signals for producing a second quotient signal,
first and second low pass filter means respectively responsive to said first and second computer means,
first and second multiplier means,
said first multiplier means being responsive to said first computer means and to said second low pass filter means,
said second multiplier means being responsive to said second computer means and to said first low pass filter means, and
subtractor means responsive to said first and second multiplier means.

31. Apparatus as described in claim 30 wherein said first computer means includes:
first subtracter means and first adder means jointly responsive to said first and second quadrature signals, and
first divider means responsive to said first subtracter and first adder means for producing said first quotient signal.

32. Apparatus as described in claim 31 wherein said second computer means includes:
second subtracter means and second adder means jointly responsive to said third and fourth quadrature signals, and
second divider means responsive to said second subtracter and said second adder means for producing said second quotient signal.

33. Optical transducer means including:
mounting means,
optical wave guide means disposed on said mounting means and having an end,
substrate means opposite said end and parallel thereto for forming a gap therebetween,
first regular absorptive grating array means interposed within said gap at said end, regular reflecting grating array means affixed to the surface of said substrate means opposite said end, second regular absorptive grating array means affixed on said regular reflective grating array means, suspension means adapted to permit relative displacement between said first regular absorptive grating means and said end, source means for feeding light into said optical wave guide means, said source means including light source means for providing substantially monochromatic radiation at first and second separated wave lengths and branching optical wave guide means for receiving reflected light amplitude modulated as a function of said displacement.

34. Apparatus as described in claim 33 wherein said first and second regular absorptive grating array means are each formed of alternate transparent and absorbing stripes of substantially equal widths and are in aligned relation when said transducer is unexcited.

35. Apparatus as described in claim 34 wherein said regular reflective grating array means is formed of alternate absorbing and reflecting stripes of substantially equal widths.

36. Apparatus as described in claim 35 wherein said regular reflective grating array means is displaced by one half stripe width with respect to said first and second regular absorptive grating array means in the unexcited state of said transducer.

37. Apparatus as described in claim 36 wherein said branching optical wave guide means includes respective wave guiding channels having first and second narrow pass band filters respectively centered at said first and second wave lengths.

* * * * *